Patented Dec. 11, 1951

2,578,491

UNITED STATES PATENT OFFICE 2,578,491

METHOD OF ACCELERATING THE GROWTH OF MICROORGANISMS

Ralph F. Shropshire, Cambridge, Mass., assignor to Raytheon Manufacturing Company, a corporation of Delaware No Drawing. Application October 26, 1946, Serial No. 706,062

6 Claims. (Cl. 195—77)

The present invention relates to a process of accelerating the growth of micro-organisms, especially vegetable micro-organisms such as yeasts, molds and bacteria.

There are many industrial processes requiring the culture of relatively large quantities of micro-organisms; for example, yeasts for baking and fermentation; yeasts, molds and bacteria for pharmaceutical products; and bacteria for use in warfare.

It is the object of the present invention to provide a method for growing micro-organisms at a rate greatly accelerated over the normal growth rate.

According to the present invention a heavy suspension of the culture of the organisms, preferably in a nutrient medium, is treated with compressional wave vibrations for a sufficiently long period of time at a sufficiently high power level to produce cavitation, whereby the cell structure of most of the organisms is disrupted. The treated material or its filtrate is then added to a new culture of the organisms in a nutrient medium whereby an increase in the rate of growth of the new culture is obtained.

In a modification of this invention the new culture, after the addition of the filtrate, is subjected to compressional wave vibrations at a low power level. The power level to be used is sufficiently below that at which cavitation occurs to avoid disruption of the cell structure of the organisms. The vibration is continued for a period of approximately one minute to one hour depending upon the period of the life cycle of the organisms under the existing conditions; that is, only the first generation of the new culture of the organisms is subjected to low power vibrations, after which the organisms are allowed to grow during a non-vibratory growing period.

The mechanism whereby the accelerated growth of the micro-organisms results from the addition to a culture of the organisms of the filtrate obtained from organisms destroyed by high power compressional wave vibrations is not fully understood, but the following hypothesis is submitted as a possible explanation, it being understood that my invention is not in any way to be limited thereby.

It has previously been disclosed that cell structures can be destroyed by intense compressional wave vibration at cavitational power levels. It has also been known that many of the cellular organisms excrete metabolism products which encourage the further growth and multiplication of the cells. The amount of such growth-accelerating material which is given off by such organisms growing at a normal rate is, however, relatively small. I have discovered that a very large quantity of growth-accelerating material can quickly be obtained by the destruction of a culture of the organisms by compressional wave vibrations at cavitational power levels. If the material so obtained be added to a new culture of the organisms, an immediate and remarkable acceleration of the growth and reproductive rate of the organisms takes place.

On the other hand, as described in my copending application, Serial No. 706,061, filed October 26, 1946, now Patent No. 2,492,128, I have also discovered that the rate of growth of micro-organisms can be increased by subjecting the growing culture to compressional wave vibrations at a power level low enough to avoid cavitation and thereby to avoid the breaking up of the cell structure.

Therefore, as a modification of the method of this invention, I first employ the method previously described of extracting growth-promoting substances from a culture of the organisms, for example a culture of ordinary household yeast of the genus saccharomyces in a cane sugar medium, with compressional wave vibration of cavitational power level continued for a sufficient length of time to disrupt the cell structure of most of the organisms and add the material so obtained or its filtrate to a new culture of the organisms, and then further subject the new culture to compressional wave vibrations at a low power level insufficient to disrupt the organisms. A very great acceleration of the rate of growth and reproduction of the organisms is thereby obtained. The time duration of the low power vibration is preferably limited to the duration of the life of the first generation of the organisms, after which a non-vibratory growing period is provided. If desired, the third generation of the organisms may again be subjected to low power vibration, and so on.

Now having described my invention, I claim:

1. A method of accelerating the growth of a vegetable micro-organism which comprises treating a quantity of the organism in a fluid medium with compressional wave vibrations at a power level high enough to disrupt the cell structure of the organism and adding such treated material to a new culture of the organism.

2. A method of accelerating the growth of a vegetable micro-organism which comprises treating a quantity of the organism in a fluid medium with compressional wave vibrations at a power level high enough to produce cavitation and adding the material to a new culture of the organism.

3. A method of accelerating the growth of a vegetable micro-organism which comprises treating a culture of the organism in a nutrient medium with compressional wave vibrations at a power level high enough to disrupt the cell structure of the organism, filtering out the cell bodies from the treated material and adding the filtrate to a new culture of the organism in a nutrient medium.

4. A method of accelerating the growth of a vegetable micro-organism which comprises treating a culture of the organism in a nutrient medium with compressional wave vibrations at a power level high enough to disrupt the cell structure of the organism, filtering out the cell bodies from the treated material, adding the filtrate to a new culture of the organism in a nutrient medium and thereafter subjecting the new culture of the organism to compressional wave vibrations at a low power level insufficient to destroy the cell structure of the organism.

5. A method of accelerating the growth of a vegetable micro-organism which comprises treating a culture of the organism in a nutrient medium with compressional wave vibrations at a power level high enough to disrupt the cell structure of the organism, filtering out the cell bodies from the treated material, adding the filtrate to a new culture of the organism in a nutrient medium and thereafter intermittently subjecting the new culture of the organism to compressional wave vibrations at a low power level insufficient to destroy the cell structure of the organism.

6. A method of accelerating the growth of a micro-organism which comprises treating a quantity of the organism with compressional wave vibrations at a power level high enough to disrupt the cell structure of the organism, adding such treated material to a new culture of the organism and subjecting the total mixture to compressional wave vibrations at a power level insufficient to destroy the cell structure of the organism.

RALPH F. SHROPSHIRE.

REFERENCES CITED

The following references are of record in the file of this patent:

UNITED STATES PATENTS

| Number | Name | Date |
|---|---|---|
| 2,138,839 | Chambers | Dec. 6, 1938 |
| 2,196,361 | Liebesny et al. | Apr. 9, 1940 |
| 2,219,348 | Turner | Oct. 29, 1940 |

FOREIGN PATENTS

| Number | Country | Date |
|---|---|---|
| 550,317 | Great Britain | Jan. 4, 1943 |

OTHER REFERENCES

Challinor, Nature, Dec. 12, 1942, page 688, vol. 150.